(12) United States Patent
Joseph et al.

(10) Patent No.: US 9,031,118 B2
(45) Date of Patent: May 12, 2015

(54) VIRTUAL FLOATING CORRELATORS FOR GPS SENSOR

(71) Applicant: Avidyne Corporation, Lincoln, MA (US)

(72) Inventors: Angelo Joseph, Melbourne, FL (US); David McCoy, Melbourne, FL (US)

(73) Assignee: Avidyne Corporation, Lincoln, MA (US)

( * ) Notice: Subject to any disclaimer, the term of this patent is extended or adjusted under 35 U.S.C. 154(b) by 82 days.

(21) Appl. No.: 13/897,929

(22) Filed: May 20, 2013

(65) Prior Publication Data

US 2013/0308687 A1    Nov. 21, 2013

Related U.S. Application Data

(60) Provisional application No. 61/649,603, filed on May 21, 2012.

(51) Int. Cl.
| | |
|---|---|
| *H04B 1/00* | (2006.01) |
| *G01S 19/24* | (2010.01) |
| *G01S 19/30* | (2010.01) |
| *H04B 1/709* | (2011.01) |

(52) U.S. Cl.
CPC .............. *G01S 19/24* (2013.01); *G01S 19/30* (2013.01); *H04B 1/709* (2013.01); *H04B 2201/70715* (2013.01)

(58) Field of Classification Search
CPC ................ H04B 1/709; G01S 2007/2886
USPC .......................... 375/150, 152, 134
See application file for complete search history.

(56) References Cited

U.S. PATENT DOCUMENTS

| | | | |
|---|---|---|---|
| 5,005,185 A * | 4/1991 | Mizoguchi et al. ........... | 375/235 |
| 6,243,397 B1 * | 6/2001 | Yun .............................. | 370/480 |
| 6,363,108 B1 * | 3/2002 | Agrawal et al. .............. | 375/152 |
| 6,661,371 B2 * | 12/2003 | King et al. ............... | 342/357.62 |
| 6,879,913 B1 * | 4/2005 | Yu ................................. | 701/478 |
| 2005/0232340 A1 * | 10/2005 | Ye et al. ........................ | 375/148 |
| 2009/0086864 A1 * | 4/2009 | Komninakis et al. ......... | 375/346 |
| 2013/0156073 A1 * | 6/2013 | Gunawardena et al. ...... | 375/150 |
| 2013/0310097 A1 * | 11/2013 | Smith et al. ................... | 455/509 |

* cited by examiner

*Primary Examiner* — Shuwang Liu
*Assistant Examiner* — Sung Ahn
(74) *Attorney, Agent, or Firm* — Hamilton, Brook, Smith & Reynolds, P.C.

(57) ABSTRACT

In one embodiment, a correlator of a global positioning system receiver in a global positioning system receives a sample satellite signal. The correlator includes a signal comparator configured to receive the sample signal, a first normalized estimate signal, and a second normalized estimate signal. The signal comparator generates a first accumulated output and a second accumulated output. The first accumulated output represents the integration of a correlation of the sample signal and the first normalized estimate signal. The second accumulated output represents the integration of a correlation of the sample signal and the second normalized estimate signal. Using time-multiplexing, the high speed of a digital signal processing core is leveraged to perform calculations of the signal comparator and threshold comparator in real time.

19 Claims, 11 Drawing Sheets

VIRTUAL FLOATING CORRELATORS FOR GPS SENSOR

RELATED APPLICATION

This application claims the benefit of U.S. Provisional Application No. 61/649,603, filed on May 21, 2012.

The entire teachings of the above application(s) are incorporated herein by reference.

BACKGROUND

To improve the acquisition speed and performance of a typical GPS receiver, new receiver channels or additional correlator blocks within each channel are added. Such additions maximize the number of parallel searches that can be performed at any given time. Adding new receiver channels or correlator blocks within each channel generally leads to one of two tradeoffs. First, the GPS receiver can maintain flexibility by implementing the required logic in large and complex Field Programmable Gate Arrays (FPGAs) with adequate resources at a very high recurring cost of at least $2000 to $3000 per part. The GPS receiver can also sacrifice flexibility and scalability for cost savings by implementing the design in a custom fabricated multi-million gate or Application Specific Integrated Circuit (ASIC), with tremendous non-recurrent engineering costs.

SUMMARY

In one embodiment, a correlator of a GPS receiver in a global positioning system receives a sample satellite signal. The correlator includes a signal comparator configured to receive the sample signal, a first normalized estimate signal, and a second normalized estimate signal. The signal comparator generates a first accumulated output and a second accumulated output. The first accumulated output represents the integration of a correlation of the sample signal and the first normalized estimate signal (e.g., the In-Phase (I) component). The second accumulated output represents the integration of a correlation of the sample signal and the second normalized estimate signal (e.g., the Quadrature (Q) component, which is 90 degrees out of phase with the I component).

The correlator also includes a threshold comparator configured to receive the first accumulated output and the second accumulated output. The threshold comparator (a) calculates a first magnitude value based on the square of the first accumulated output and calculates a second magnitude value based on the square of the second accumulated output and (b) compares the first and second magnitude values with a threshold value. If the sum of the first and second magnitude values is greater than the threshold value, then the threshold comparator determines that a successful signal detection was made (e.g., $I^2+Q^2$ is greater than the threshold value) and allows continued tracking of an estimate signal as the sample signal. The estimate signal is derived from the first and second normalized estimate signals.

In one embodiment, the signal comparator includes a demodulator configured to demodulate the sample signal to form a first normalized signal and a second normalized signal. The signal comparator also includes a mixer configured to intersect the first normalized signal with the first normalized estimate signal to form a first resultant signal and to intersect the second normalized signal with the second normalized estimate signal to form a second resultant signal. In other words, the mixer is configured to mix the sample signal (e.g., an input signal) with a carrier signal to produce the I and Q outputs at a baseband frequency. The signal comparator further includes an accumulator coupled to receive over an accumulation time period the first resultant signal and the second resultant signal, the accumulator integrating the first resultant signal to form the first accumulated output and the second resultant signal to form the second accumulated output over the accumulation time period, the first and second accumulated outputs indicating the correlation of the sample signal with an estimate signal over the accumulation time period. If the sum of the first magnitude value (e.g., $I^2$) and second magnitude value (e.g., $Q^2$) is greater than the threshold value, the threshold comparator allows continued tracking of the estimate signal as the sample signal.

The threshold comparator includes a multiplier configured to calculate the first magnitude value on a first clock cycle and to calculate the second magnitude value on a second clock cycle. The multiplier is built within an FPGA and not built from discrete logic gates inside the FPGA. The threshold comparator also includes a multiplexer, a first register, a second register, and a subtractor. The multiplexer is coupled with a threshold value and the output of the second register as inputs. The threshold comparator stores the first magnitude value in the first register. The subtractor subtracts the output of the first register with the threshold value of the multiplexer and stores a temporary result in the second register. The threshold comparator further stores the second magnitude value in the first register. The subtractor further subtracts the output of the first register with the temporary result of the second register selected by the multiplexer and stores the result in the second register. The result in the second register is the sum of the first and second magnitude values.

A person of ordinary skill in the art can recognize that the calculation output is represented by Threshold Value$-I^2$ on a first clock cycle. Then, on the second clock cycle, the output is Previous Result (e.g., Threshold Value$-I^2$)$-Q^2$. If this final output is negative (e.g., less than zero) then $I^2+Q^2$ must exceed the Threshold Value. This maximizes the pipeline efficiency and allows a new comparison to be made every other clock instead of requiring "dead time" to load the threshold, I, or Q values.

The mixer intersects the first normalized signal with a plurality of first normalized estimate signals to form a plurality of first resultant signals. The mixer intersects a second normalized signal with a plurality of second normalized estimate signals to form a plurality of second resultant signals.

The accumulator is coupled to receive the plurality of first resultant signals and the plurality of second resultant signals. The accumulator integrates each of the first resultant signals to form a plurality of first accumulated outputs. The threshold comparator then integrates the plurality of second resultant signals to form a plurality of second accumulated outputs over the accumulation time period. Each of the first and second accumulated outputs indicate the correlation of the sample signal with one of the estimate signals over the accumulation time period.

The threshold comparator receives the first accumulated outputs and the second accumulated outputs. Each first accumulated output corresponds with a different second accumulated output. The threshold comparator (a) for each of the first accumulated outputs, calculates a first magnitude value based on the square of the first accumulated output and calculates a second magnitude value based on the square of the second accumulated output corresponding to the first accumulated output. The threshold comparator (b) compares the first and second magnitude values with the threshold value. If a given sum of the first and second magnitude values is greater than the threshold value, the threshold comparator allows tracking of the estimate signal corresponding to the first and second accumulated outputs of the given sum to continue. The estimate signals are derived from the first normalized estimate signals and second normalized estimate signals.

A multiplexing signal and a time-division multiplexer are coupled with the first normalized estimate signals and second normalized estimate signals. The multiplexing signal selects among the first normalized estimate signals and the second normalized estimate signals from the time-division multiplexer.

In one embodiment, an FPGA is configured to implement at least one of the signal comparator and the threshold comparator. A digital signal processing block of the FPGA may be configured to implement the threshold comparator. For example, using time-multiplexing, the high speed of the digital signal processing core is leveraged to perform calculations of the signal comparator and threshold comparator in real time.

In one embodiment, the correlator includes multiple signal comparators and multiple threshold comparators, wherein the correlator is configured to reroute the multiple signal comparators and the multiple threshold comparators to detect a plurality of estimate signals. If a given pair formed of one signal comparator and one threshold comparator detects one estimate signal in the estimate signals, the given pair searches for a successive estimate signal in the plurality of estimate signals.

A method comprises demodulating the sample signal to form a first normalized signal and a second normalized signal. The method further includes intersecting the first normalized signal with a first normalized estimate signal to form a first resultant signal and intersecting the second normalized signal with a second normalized estimate signal to form a second resultant signal. The method further includes integrating the first resultant signal to form a first accumulated output over an accumulation time period. The first accumulated output indicates the correlation of the sample signal with an estimate signal over the accumulation time period. The method further includes integrating the second resultant signal to form a second accumulated output over the accumulation time period. The second accumulated output indicates the correlation of the sample signal with the estimate signal over the accumulation time period. The method further includes calculating a first magnitude value based on the square of the first accumulated output. The method further includes calculating a second magnitude value based on the square of the second accumulated output. The method further includes comparing the sum of the first and second magnitude values with a threshold value. The method further includes alerting a GPS receiver to continue tracking the estimated signal as the sample signal if the sum of the first and second magnitude values is greater than the threshold value. The estimate signal is derived from the first and second normalized estimate signal.

In another embodiment, the system comprises a GPS receiver system that receives a sample satellite signal including a multiplexer, and multiple correlators. The multiple correlators are configured to receive (i) a plurality of estimate signal from the multiplexer and (ii) the sample signal. The multiplexer selects each estimate signal by time-division multiplexing. Each correlator is configured to issue a detect signal when the received estimate signal matches the sample signal.

A plurality of select logic is coupled to the plurality of correlators, the plurality of estimate signals, and the detect signal of each correlator. The select logic is configured to route unmatched estimate signals to a correlator that has issued a detect signal such that the plurality of correlators are effectively engaged.

In one embodiment, a method in a global positioning system for receiving a sample signal includes receiving the sample signal and a plurality of estimate signals from a multiplexer. The method further includes selecting, at the multiplexer, each of the plurality of estimate signals by time-division multiplexing to send to one of a plurality of correlators. The method further includes issuing, from one of the plurality of correlators, a detect signal when one of the plurality of estimate signals matches the sample signal.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION

A description of example embodiments follows.

Figure 1:
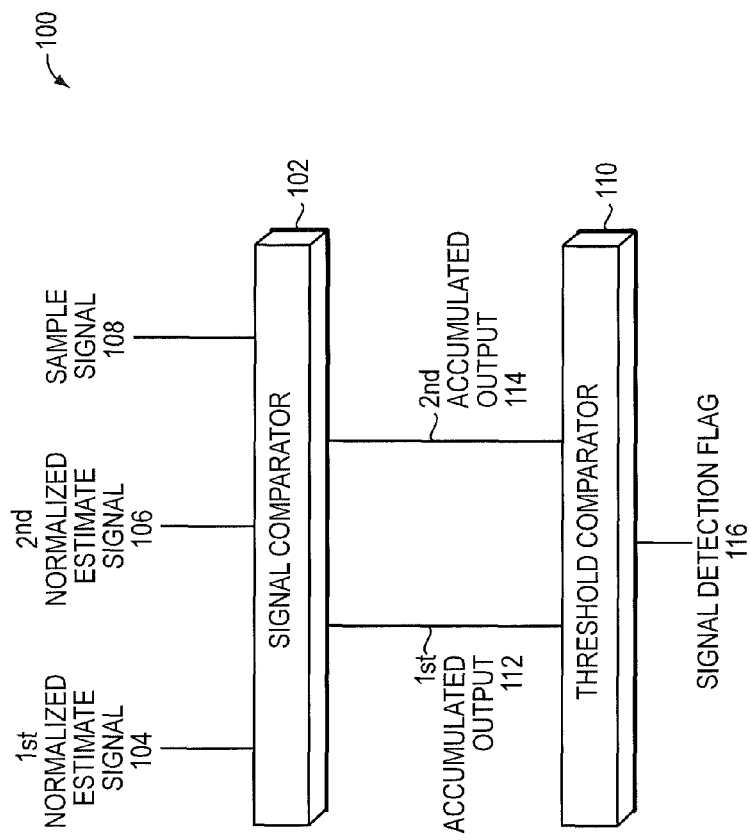
FIG. 1 is a block diagram illustrating a correlator.

FIG. 1 is a block diagram illustrating a correlator 100. The correlator 100 includes a signal comparator 102 and a threshold comparator 110. The signal comparator 102 receives as inputs a first normalized estimate signal 104, a second normalized estimate signal 106 and a sample signal 108.

The first and second normalized estimate signals 104 and 106 can also be known baseband signals. Each normalized estimate signal 104 and 106 is either the cosine or sine component of an estimate signal. The signal comparator 102 then compares the sample signal 108 to the first and second normalized estimate signals 104 and 106 by first multiplying the first normalized estimate signal 104 with a normalized sample signal 108 into a first accumulated output 112 and second, multiplying the second normalized estimate signal 106 with a second normalized sample signal 108 to create the second accumulated output 114.

The threshold comparator 110 receives as inputs the first accumulated output 112 and the second accumulated output 114. The threshold comparator 110 determines if the first accumulated output 112 and the second accumulated output 114 reach a threshold indicating whether the estimate signal of the first and second normalized estimate signals 104 and 106 matches the sample signal 108. The threshold comparator 110 issues a signal detection flag 116 when the first and second normalized estimate signals 104 and 106 do match (i.e., sufficiently match) the sample signal 108.

Figure 2:
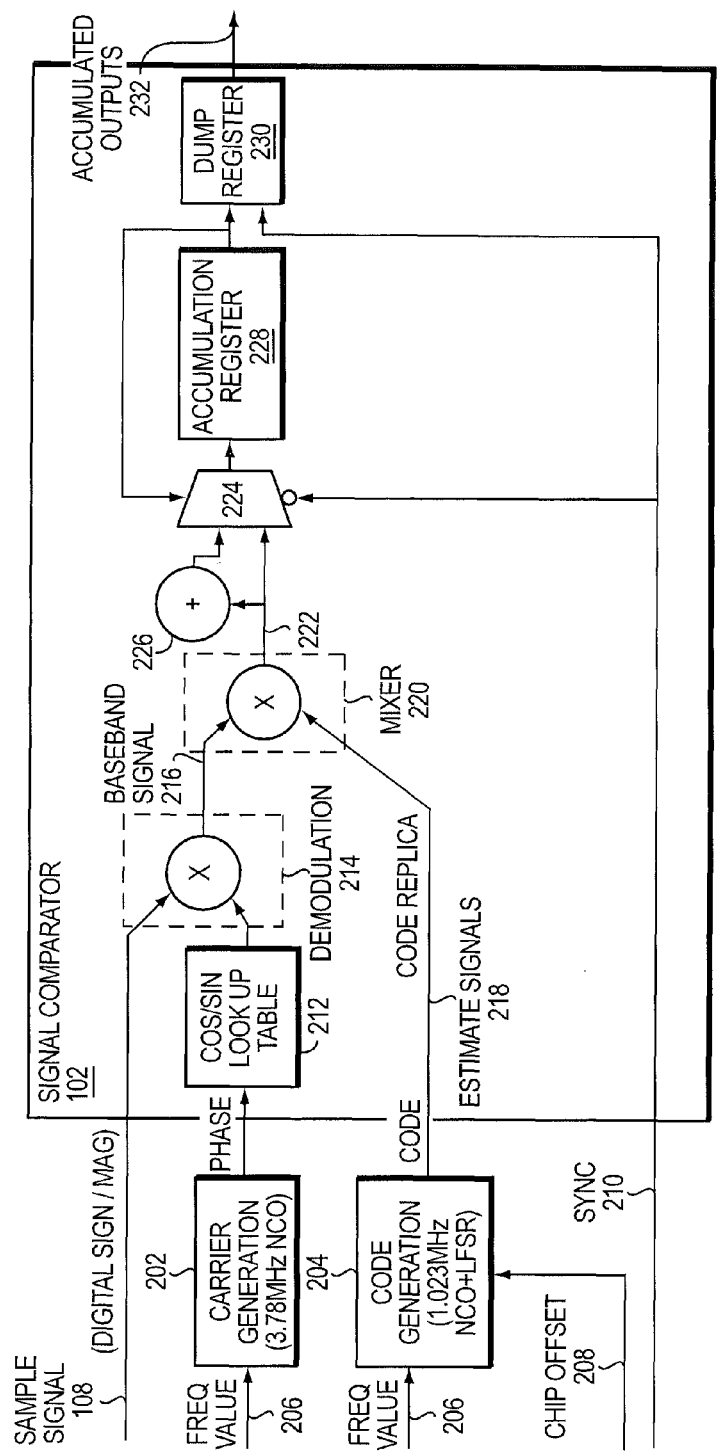
FIG. 2 is a schematic diagram of the signal comparator of FIG. 1, a carrier frequency generation unit and a CODE generation unit.

FIG. 2 illustrates the signal comparator 102, a carrier frequency generation unit 202 and a CODE generation unit 204. The carrier frequency generation unit 202 receives as input a frequency value 206 that sets the frequency of a generated carrier frequency signal. The CODE generation unit 204 takes as input the frequency value 206 that sets the frequency of generated estimate signals 218. The estimate signals 218 include the first normalized estimate signal 104 and the second normalized estimate signal 106 of FIG. 1. The CODE generation unit 204 also receives as input a chip offset value 208 to generate the estimate signals 218. As an example, if the first normalized estimate signal 104 is the sine component of the estimate signal, the first normalized sample signal 108 is also the sine component of the sample signal. The second normalized estimate signal 106 is then the cosine component of the estimate signal and the second normalized sample signal 108 is the cosine component of the sample signal. In this way, the first accumulated output 112 and second accommodated output 114 represent the intersection of their respective first and second normalized estimate signals 104, 106 with their respective first and second normalized sample signals. The chip offset value 208 represents the offset of the generated estimate signals 218. The chip offset value 208 changes as the correlator 100 searches for different code signals in the sample signal 108. In another embodiment, the CODE generation unit 204 can be adjusted to search for different code offsets of the same code signal (i.e., the code signal displaced in time with 0 to 1023 'chips' of time delay).

The signal comparator 102 receives as input the sample signal 108, the output of the carrier generation unit 202, the estimate signals 218 generated by the CODE generation unit 204, and a synchronization signal 210. The output of the carrier generation unit 202 is coupled to input to a COS/SIN lookup table 212.

The COS/SIN lookup table 212 is configured to output either values of a cosine or sine signal to demodulate the sample signal 108 at a demodulation unit 214. The demodulation unit 214 is coupled to receive as input the sample signal 108 and the output of the COS/SIN lookup table 212 and outputs a normalized signal 216. A mixer unit 220 inputs the normalized signal 216 and the estimate signals 218. The mixer unit 220 multiplies each bit of the normalized signal 216 to the corresponding bit of the selected estimate signal 218. The mixer unit 220 outputs the product of this multiplication as a resultant signal 222.

A signal comparator multiplexer 224 and a signal comparator adder 226 are both coupled to receive the resultant signal 222. The signal comparator multiplexer 224 is also coupled to receive the synchronization signal 210 as a selection signal. When the synchronization signal 210 activates, the signal comparator multiplexer 224 selects the resultant signal 222 to output to an accumulation register 228. The accumulation register 228 outputs to a dump register 230 and also to the signal comparator adder 226. When the synchronization signal 210 is inactive the signal comparator multiplexer 224 selects the output of the signal comparator adder 226. The signal comparator adder 226 adds the resultant signal 222 to the output of the accumulation register 228. When the synchronization signal 210 activates again, the accumulation register 228 outputs to the dump register 230, and the dump register 230 outputs accumulated outputs 232. Meanwhile, the synchronization signal 210 selects the resultant signal 222 from the signal comparator multiplexer 224 to input into the accumulation register 228, effectively resetting the accumulation register 228. In this way, the signal comparator 102 integrates the product of normalized versions of the sample signal 108 with normalized versions of the estimate signals 218 into the accumulated outputs 232.

Figure 3:
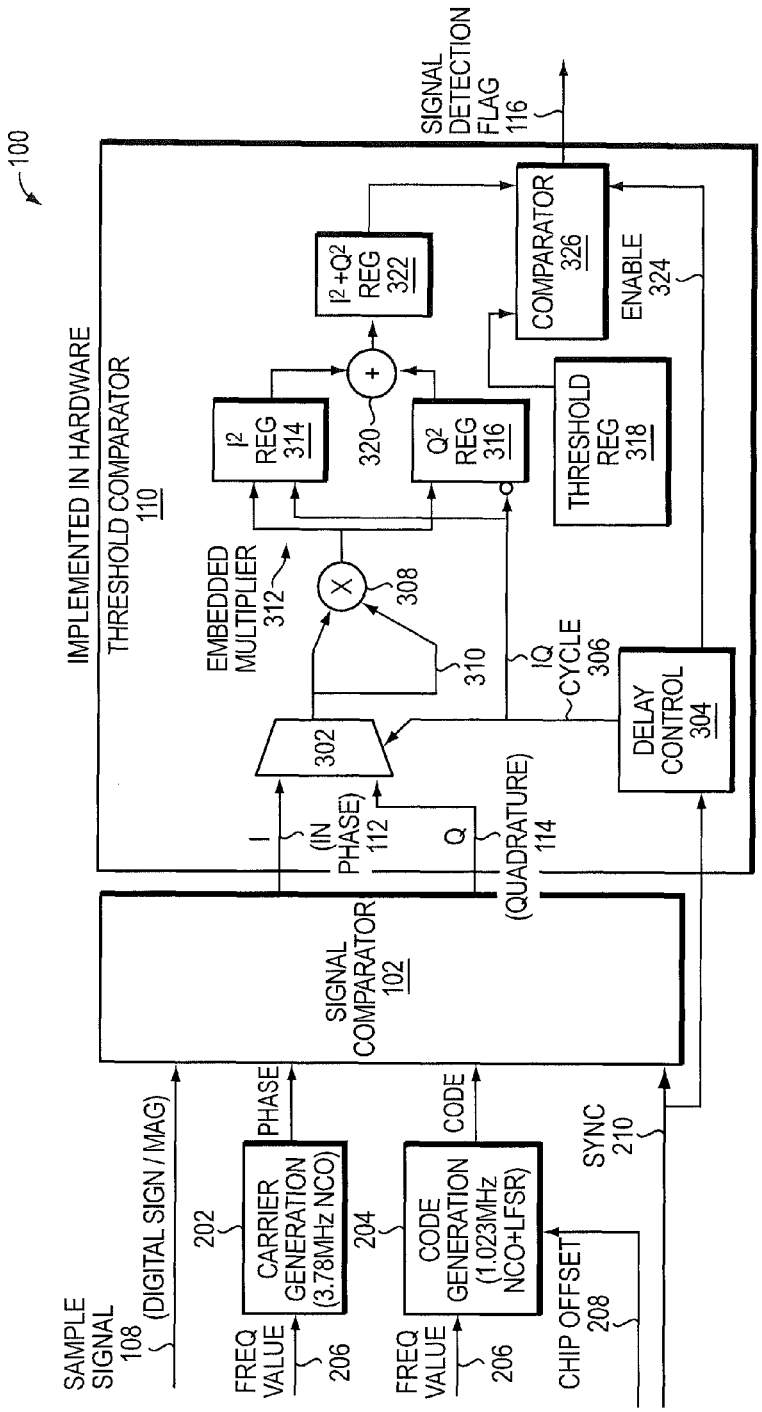
FIG. 3 is a block diagram illustrating a more detailed version of the correlator 100.

FIG. 3 is a block diagram illustrating a more detailed version of the correlator 100. The signal comparator 102 displayed in FIG. 3 operates similarly to the signal comparator 102 displayed in FIG. 2. The first accumulated output 112 and second accumulated output 114 illustrated in FIG. 3 and also in FIG. 1 are represented in FIG. 2 as the accumulated outputs 232, however, the threshold comparator 110 inputs the first accumulated output 112 and second accumulated output 114 at a threshold comparator multiplexer 302. The first accumulated output 112 represents an in-phase (I), or sine, component of the accumulated output 232 and the second accumulated output 114 represents the quadrature (Q), or cosine, component of the accumulated output 232.

The threshold comparator 110 also includes a delay control unit 304 which is coupled to the threshold comparator multiplexer 302 as a selection signal. The delay control unit 304 is coupled to receive the synchronization signal 210 and outputs an I/Q selection signal 306 to the threshold comparator multiplexer 302. The delay control unit 304 is configured to cycle between selecting the in-phase (I) signal and the quadrature (Q) signal according to the time of the synchronization signal 210.

The multiplexer 302 outputs a selected signal 310 to an embedded multiplier 308. The embedded multiplier 308 is embedded in a digital signal processing core of the FPGA. Using the embedded multiplier 308 saves cost and resources and prevents redesigning a new multiplier, which consumes valuable FPGA resources. For example, a separately designed multiplier can consume combinatorial logic resources, such as LUTs in a Xilinx FPGA. The selected signal 310 is coupled to both inputs of the embedded multiplier 308 to square the selected signal 310, output as a magnitude value 312.

The embedded multiplier 308 is coupled to output the magnitude value 312 to a first magnitude register 314 or a second magnitude register 316. Both the first magnitude register 314 and the second magnitude register 316 are also coupled to receive the I/Q selection signal 306 from delay control unit 304. In this manner, when the I/Q selection signal selects the first accumulated output 112 at the threshold comparator multiplexer 302, the embedded multiplier 308 outputs the magnitude value 312 to the first magnitude register 314. Similarly, when the I/Q selection signal 306 selects the second accumulated output 114 at the threshold comparator multiplexer 302, the embedded multiplier 308 outputs the magnitude value 312 to the second magnitude register 316. As such, the first magnitude register 314 stores the magnitude of the in-phase component of the accumulated output and the second magnitude register 316 stores the magnitude of the quadrature component of the accumulated output.

A threshold comparator adder 320 is coupled with the first magnitude register 314 and the second magnitude register 316 to add the value stored in both registers and output the sum into a total magnitude register 322. The total magnitude register 322 is coupled to output to comparator 326. The comparator 326 is also coupled to receive input from threshold magnitude register 318 and an enable signal 324 outputted from the delay control unit 304. The enable signal 324 is configured to enable the comparator 326 only when the total magnitude register 322 is storing a current sum of the first magnitude register 314 and the second magnitude register 316. When the comparator 326 is enabled by the enable signal 324, the comparator compares the value in the total magnitude register 322 to the value in the threshold magnitude register 318. When the value in the total magnitude register 322 is greater than or equal to the value of the threshold magnitude register 318, the comparator 326 outputs a signal detection flag 116. When the value stored in the total magnitude register 322 is less than the value in the threshold magnitude register 318, the comparator 326 does not issue the signal detection flag 116. In this manner, the threshold comparator 110 issues a signal detection flag 116 when the sum of the signals of the magnitudes of the normalized accumulated signals is greater than a given threshold stored in the threshold magnitude register 318.

Figure 4:
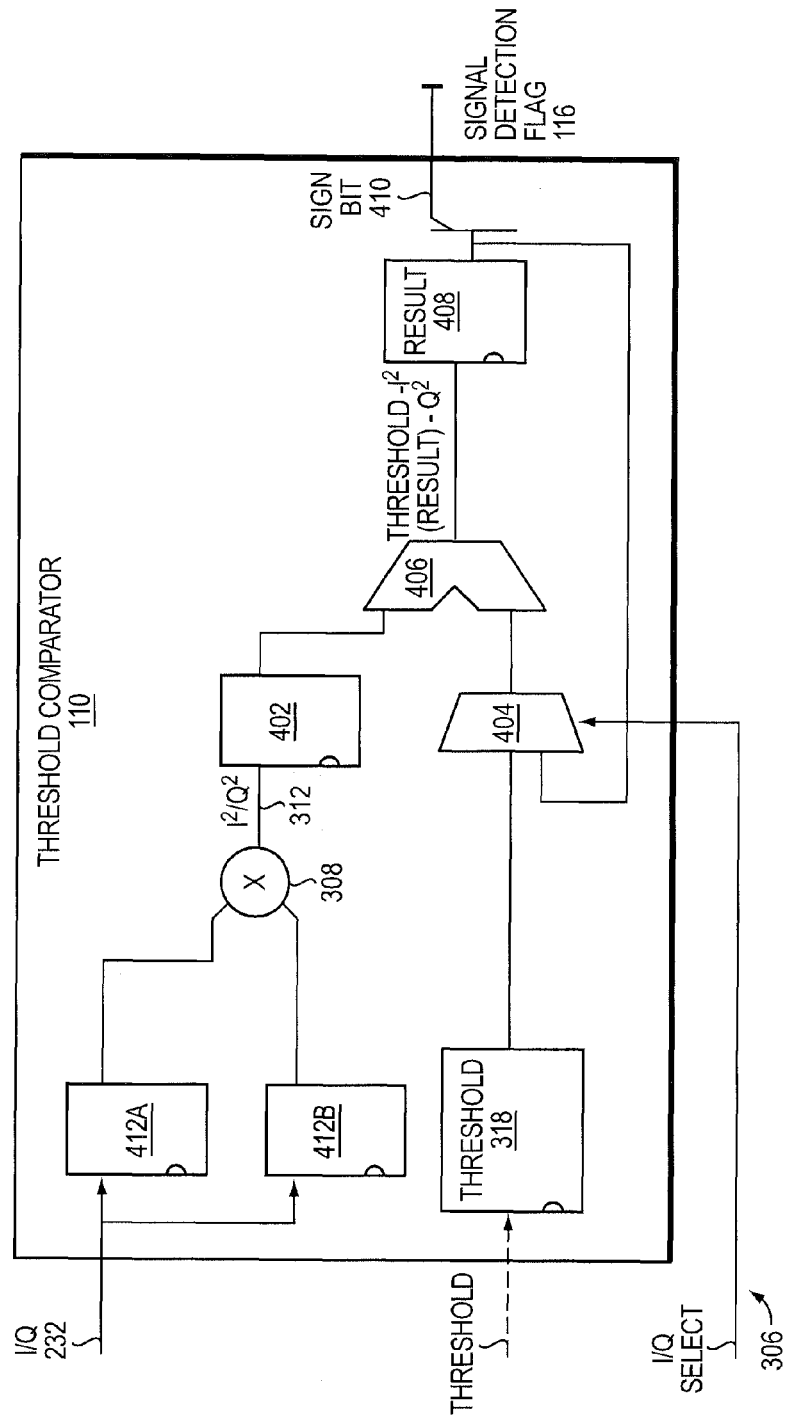
FIG. 4 is a block diagram illustrating another embodiment of the threshold comparator of the correlator of FIG. 1.

FIG. 4 is a block diagram illustrating another embodiment of the threshold comparator 110. The threshold comparator 110 inputs the accumulated outputs 232 at a first squaring register 412A and a second squaring register 412B. The accumulated outputs 232 alternate between transmitting the in-phase (I) component and the quadrature (Q) component to the threshold comparator 110, as further described above in the discussion of FIG. 3. In the FIG. 4 configuration, the first and second squaring registers 412A and 412B alternate between storing the in-phase component of the accumulated outputs 232 and the quadrature component of the accumulated outputs 232.

Both the first squaring register 412A and the second squaring register 412B are coupled to output to the embedded multiplier 308. The embedded multiplier 308 is configured to multiply the outputs of both the first and second squaring registers 412A and 412B to output the magnitude value 312 which represents the square of the in-phase or quadrature component of the accumulated output 232. The magnitude value 312 is then stored in a magnitude register 402.

The magnitude register 402 is coupled to output to a subtractor 406. The subtractor 406 is coupled to output to a subtractor result register 408. The subtractor result register 408 is coupled to output to a subtractor selector multiplexer 404. The subtractor selector multiplexer 404 is also coupled to receive a threshold value from the threshold magnitude register 318 as an input and the I/Q selection signal 306 as a selection signal.

On a first clock cycle the subtractor 406 is configured to subtract the value in the magnitude register 402, which stores the square of the in-phase component of the accumulated output on this clock cycle, from the value in the threshold magnitude register 318. The subtractor selector multiplexer 404 selects the threshold magnitude register 318 on the first clock cycle by using the I/Q selection signal 306. The subtractor 406 outputs the result on this clock cycle to the subtractor result register 408. On a second clock cycle, the subtractor 406 subtracts the value of the magnitude register 402, which stores the square of the quadrature component of the accumulated output of the second clock cycle, from the value stored in the subtractor result register 408. Again, the subtractor selector multiplexer 404 selects the value from subtractor result register 408 based on the I/Q selection signal 306. The subtractor 406 stores this new result in the subtractor result register 408. On this second clock cycle the threshold comparator 110 uses a subtraction result sign bit 410 as the signal detection flag 116. If the result stored in the subtractor result register 408 is negative, the sum of the square of the in-phase and quadrature components (of the accumulated outputs 232) is greater than or equal to the threshold value. Therefore, the threshold comparator issues the signal detection flag 116.

In one embodiment, the embodiment of the threshold comparator is implemented on a Xilinx digital signal processing core block. In this embodiment, no general purpose FPGA resources (such as LUTs or registers) are needed to implement this functionality. The entire threshold comparison and signal detection are "free" from using physical FPGA resources, allowing this embodiment to be smaller and faster than other approaches.

Figure 5A:
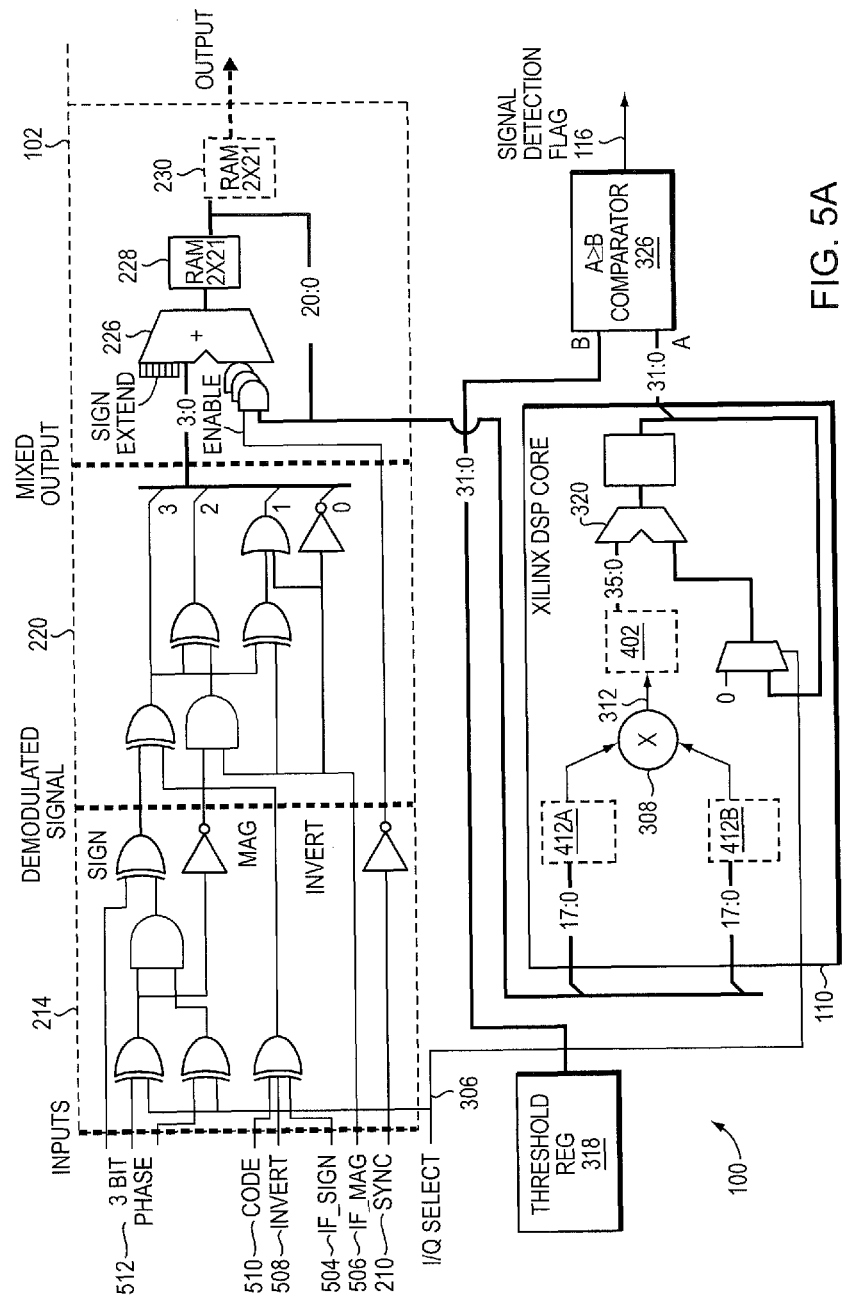
FIGS. 5A and 5B are a schematic diagrams illustrating embodiments of the correlator and threshold comparator.

FIG. 5A is a schematic diagram illustrating another embodiment of the correlator 100. The correlator 100 as in FIGS. 1-4, includes a signal comparator 102 and a threshold comparator 110. The signal comparator 102 inputs phase bits 512, a code bit 510, an invert bit 508, a sample signal magnitude 506, a sample signal sign 504 and a synchronization signal 210. The demodulation unit 214 operates similarly to the demodulation unit 214 shown in FIG. 2. In FIG. 5, the internal logic of the demodulation unit 214 is illustrated in more detail.

Similarly the mixer unit 220 operates similarly to the mixer unit of FIG. 2. The mixer unit 220 of FIG. 5 is also illustrated in more detail with regards to the internal logic circuitry. A person of ordinary skill in the art can recognize that the demodulator and mixer are designed such that each output signal is generated from no more than four input signals. This implementation leverages the Xilinx LUT architecture for maximum speed. Referring to FIG. 5, the signal comparator adder 226 receives the output of the mixer unit 220 as a first input. The signal comparator adder 226 outputs to the accumulation register 228 which then outputs back to the signal comparator adder 226 as a second input. The signal comparator adder 226 is configured to only output to the accumulation register 228 when the synchronization signal 210 is activated. The accumulation register 228 and dump register 230 are implemented using 2-word RAM units such that I and Q components can be stored in the same blocks to increase efficiency. RAMs are used because they naturally scale to larger virtual correlator sizes, such as the embodiments described in FIGS. 8-10. In this case, the SYNC signal pulses high for the first I and Q samples of an accumulation cycle. This causes the RAM values for I and Q to be reset to I+0 and Q+0 in order to start a new accumulation. In this way, the I and Q data can be intermixed and the correlator logic made to do the work of two single correlators via time-multiplexing. These two "virtual correlators" then form the equivalent of a single "Complex Correlator" (since it processes both I and Q components).

The output of the accumulation register 228 is further coupled with the threshold comparator 110. The threshold comparator 110 inputs the 18 most significant bits of the output of the accumulation register 228. A person of ordinary skill in the art can recognize that the threshold comparator 110 inputs the 18 most significant bits of the output of the accumulation register 228 because of the 18-bit input limit of the Xilinx digital signal processing core. However, a person of ordinary skill in the art can further recognize that a digital signal processing the threshold comparator 110 can input more bits using a digital signal processing core that allows input of more input bits. As described in FIGS. 3 and 4, each normalized component of the accumulation output is stored in a first squaring register 412A and a second squaring register 412B. The embedded multiplier 308 then squares the normalized components of the accumulated output 232 by multiplying the values in the first and second squaring registers 412A and 412B and generates a magnitude value 312, which is stored in the magnitude register 402. The magnitude register 402 outputs to a threshold comparator adder 320. The threshold comparator adder 320 outputs to a total magnitude register 322. The total magnitude register 322 outputs to an adder selector multiplexer 502, which receives the I/Q selection signal 306 as a selection bit and a hardwired zero as an input bit.

On a first clock cycle the adder selector multiplexer 502 selects the hardwired zero. On a second clock cycle, when the total magnitude register 322 stores a value, the adder selector multiplexer 502 selects the output of the total magnitude register 322. In this manner, on the first clock cycle the threshold comparator adder 320 adds the first magnitude value 312 to the total magnitude register 322 and to the hardwired zero. On the second clock cycle, the threshold comparator adder 320 adds the second magnitude value 312 to the value stored in the total magnitude register 322. The total magnitude register 322 then outputs to the comparator 326, which is coupled to receive the value of the threshold magnitude register 318. When the value of the total magnitude register 322 is greater than or equal to the value in the threshold register 318, the comparator issues the signal detection flag 116. When the value in the total magnitude register 322 is less than the value in the threshold register 318, the comparator 326 does not issue the signal detection flag 116. A person of ordinary skill in the art can replace the threshold comparator 110 in FIG. 5 with the threshold comparator 110 of FIG. 4 and FIG. 3. Further, a person of ordinary skill in the art can recognize that the threshold comparators 110 and combinations of the parts within the threshold comparators of FIGS. 3, 4 and 5 are interchangeable.

Figure 5B:
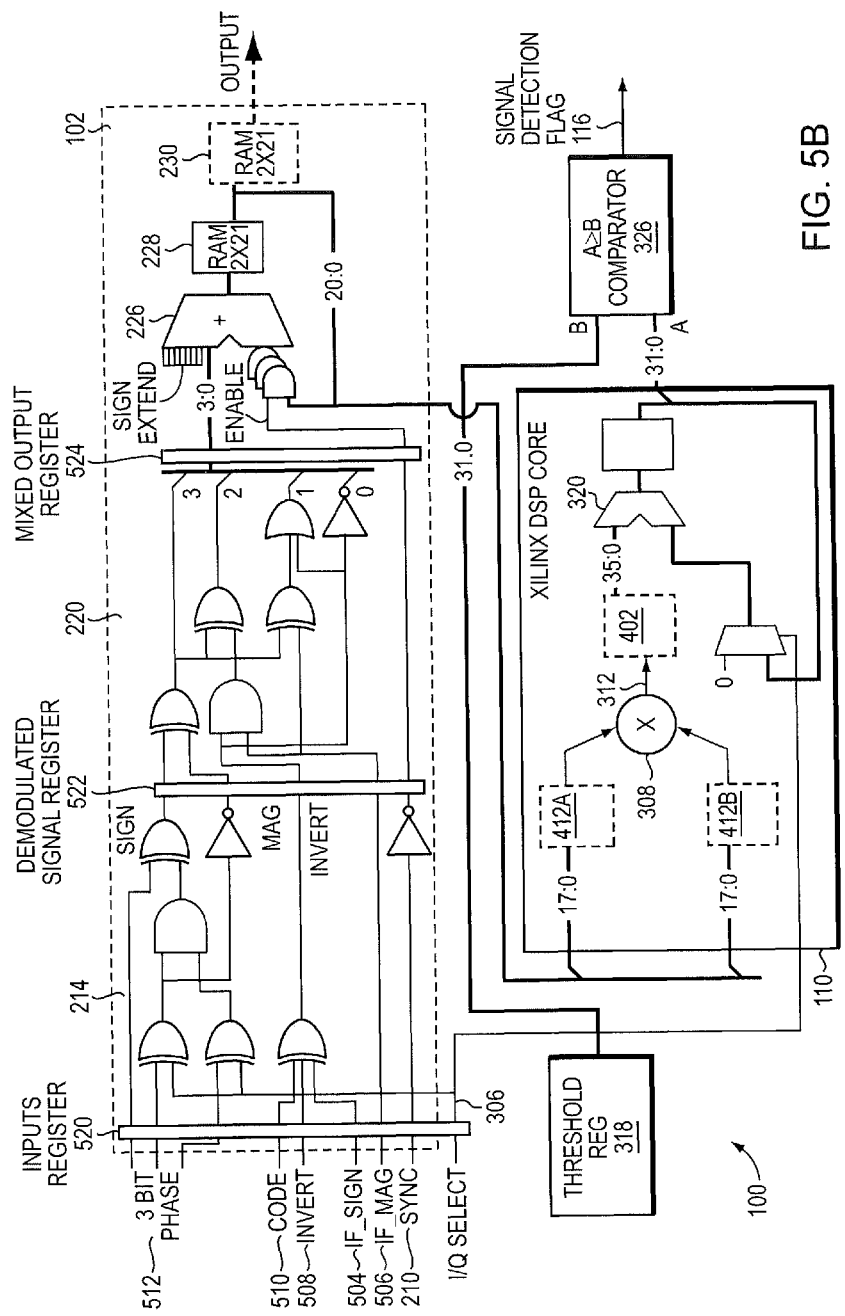

FIG. 5B is a schematic diagram of another embodiment of the correlator 100. The correlator 100 illustrated in FIG. 5B includes an input register 520, a demodulated signal register 522, and a mixed output register 524. Each register 520, 522, and 524 introduce a pipeline delay to increase the speed of the design. In this pipelined implementation, the registers 520, 522, and 524, as can be implemented by a person of ordinary skill in the art, allow the correlator 100 to perform calculations in stages, optimizing use of the logic. Pipelining, as described herein, can therefore increase the number of "virtual correlators" possible, as described in more detail in reference to FIG. 8.

Figure 6:
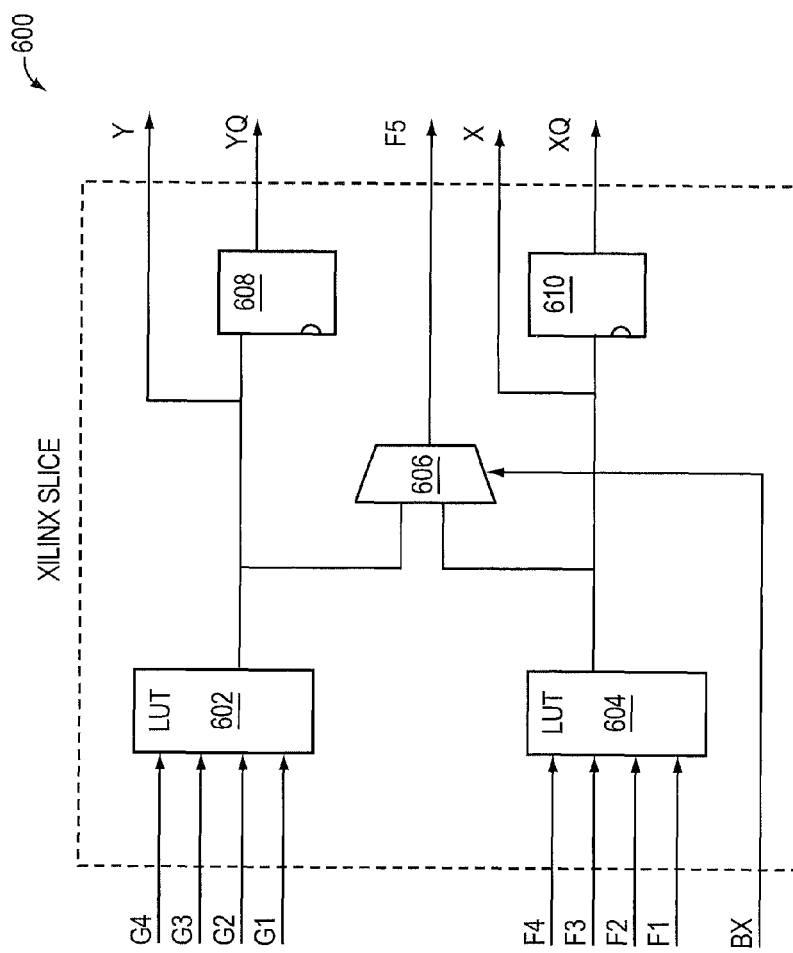
FIG. 6 is a block diagram of a Xilinx slice (FPGA resources) that can be employed in embodiment(s).

FIG. 6 illustrates a block diagram of Xilinx FPGA logic resources 600 that can be employed in an embodiment. The Xilinx FPGA logic resources 600 contains a first LUT (look up table) 602, a second LUT 604, a Xilinx multiplexer 606, a first Xilinx register 608 and a second Xilinx register 610. Xilinx FPGAs are efficient at implementing logic functions with eight inputs in a single slice or four inputs in a half slice. Xilinx FPGA logic resources 600 can implement more complicated functions. As such, as shown by FIG. 5, the embodiment of the correlator 100 utilizes logic functions with up to four inputs. The signal comparator 102 uses one four input LUT for sign calculation and one two input LUT for magnitude calculation.

Figure 7A:
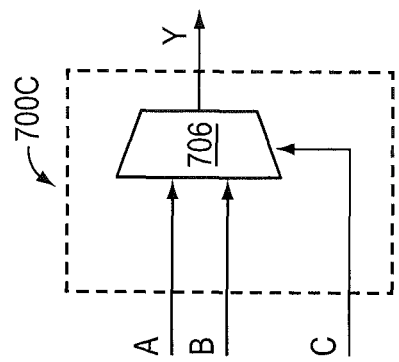
FIG. 7A-7C are block diagrams of other FPGA logic resources that can be employed in embodiment(s).
Figure 7B:
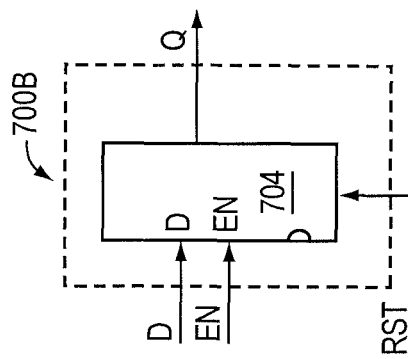
Figure 7C:
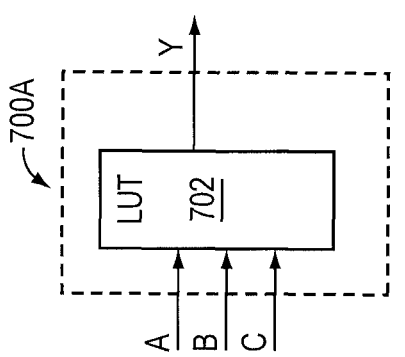

FIG. 7A-C illustrate a block diagrams of Actel Versa logic resources 700a, b, c, integrated in embodiments of correlator 100. Actel FPGA logic resources 700a, b, c, are more simplified than the Xilinx FPGA logic resources 600 but are usually present in greater numbers. Actel FPGA logic resources 700a, b, c are efficient at implementing 3 input logic functions in a single VersaTile. Shown are a look up table (LUT) 702 Actel FPGA logic tile 700a, a register 704 Actel FPA logic tile 700b, and a multiplexer 706 Actel FPGA logic tile 700c.

A FPGA synthesis engine maps logical functions into FPGA resources 600, 700 to achieve identical results as discrete logic gates connected together. Intelligently written logic functions minimize wasted resources on the FPGA. The utility of each LUT 602, 604, 702 is maximized by writing register-transfer level descriptions with three- or four-input logic equations. For example, logic that uses two-input functions to calculate intermediate values fed to other two-input functions waste significant FPGA resources if the FPGA synthesis engine does not re-optimize the logic. LUT 602, 604, 702 usage is maximized by writing signal assignments so they use three or four inputs each. In one embodiment, the inputs are from registers (e.g., the threshold register 318, described above in FIGS. 2-5).

For example, in the preferred embodiment 100 architecture the entire signal demodulation logic at 214 is written in a single Xilinx slice 600 including one four-input LUT for sign calculation and one two-input LUT for magnitude calculation. Furthermore, the C/A code replica and an invert signal with the sample signal's SIGN value is passed into the mixer logic at 220 as a composite signal. The downstream mixer logic is implemented in only three additional LUTs because invert inputs are collapsed into the routing resources. Therefore, a third auxiliary invert input is added to the composite mixer invert signal. Performing an additional inversion is valuable for search logic that tracks data bit transitions in the sample signal 108. Since three-input logic functions consume no more resources than two-input logic functions, the auxiliary inverted input is provided at no resource cost and provides additional performance improvements. Using a Xilinx FPGA, three Xilinx slices 600 implement the entire demodulation, inversion, and mixer logic.

Logic optimizations enable creation of two identical halves of a complex correlator. All inputs to both of the correlator halves in the complex correlator arrangement are the same with the only difference being the COS/SIN lookup table 212. However, the I/Q select input can switch between sine and cosine in the COS/SIN lookup table 212. Both identical halves are combined into a single complex correlator block. Either half of the complex correlator 100 can act as the complete complex correlator by toggling the I/Q select input and accumulating sample values at twice the sample rate. This half of the complex correlator appears to software as two independent complex correlator halves connected together as a complex correlator block when the accumulated sample values are stored in two independent accumulation registers that are interleaved.

Furthermore, resources can be further reduced by packing the accumulation registers into a two-word deep RAM block because parallel registers that are individually accessed are effectively the same as RAM. Xilinx FPGAs can convert four-input LUTs 602, 604 in certain Slices 600 to 16×1 distributed RAM blocks. Each bit of the parallel accumulation registers is condensed into a single local LUT/distributed RAM block that keeps the limited number of dedicated deep RAM blocks in the FPGA free for other uses.

Figure 8:
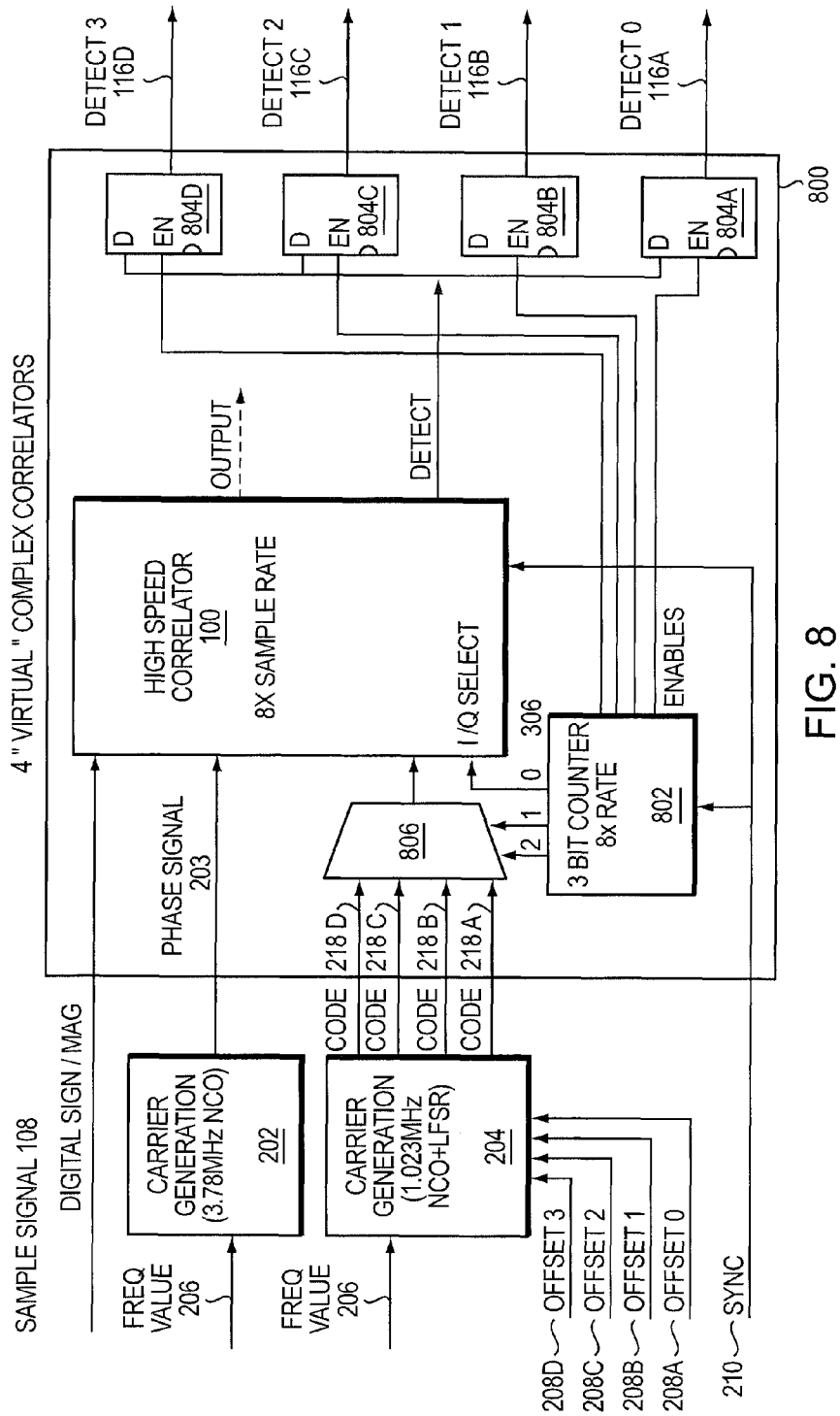
FIG. 8 is a schematic illustration of virtual complex correlators embodying the present invention.

FIG. 8 illustrates virtual complex correlators 800 embodying the examples of the present invention. The virtual complex correlators 800 input the sample signal 108, a phase signal 203 generated by the carrier frequency generation unit 202, and a plurality of estimate signals 218A-D generated by the CODE generation unit 204. Each of the plurality of estimate signals 218A-D has a corresponding offset 208A-D. The CODE generation unit 204 generates each of the plurality of estimate signals 218A-D based on an offset 208A-D. The virtual complex correlators 800 also input a synchronization signal 210. Each block of virtual complex correlators 800 includes a correlator 100. The digital signal processing core of the FPGA that the correlator 100 resides on can have a sample rate of eight, ten, or more than ten times that of the sample signal 108. The correlator 100 using time multiplexing, can process four estimate signals at once because each estimate signal is broken into two normalized signals which gives the correlator 100 a total of 8 signals per clock cycle to analyze.

The correlator 100 is coupled with the sample signal 108, the phase signal 203, an output of a code selection multiplexer 806, a I/Q selection signal 306 and a synchronization signal 210. The virtual complex correlators further includes a 3-bit counter unit 802. The two highest bits of the 3-bit counter unit 802 are coupled to the code selection multiplexer 806 and are configured to select one of the plurality of estimate signals 218A-D. The lowest bit of the 3-bit counter unit 802 is the I/Q selection signal 306.

The correlator 100 operates as described above in prior figures, however, the 3-bit counter 802 also outputs enable lines to a plurality of signal detection registers 804A-D. These enable lines enable the signal detection register 804A-D corresponding with the estimate signal 218A-D that the correlator 100 is analyzing during that particular clock cycle. The signal detection registers 804A-D output a corresponding signal detection flag 116A-D when a signal is detected.

Each virtual correlator block can benefit from a digital signal processing core. For example, an FPGA which contains 84 digital signal processing cores can be used for as many as 84 virtual complex correlators. A person of ordinary skill in the art can appreciate that an FPGA with more digital signal processing cores can support more virtual complex correlators, and 84 is provided as an example. In addition, a person of ordinary skill in the art can appreciate that digital signal processing cores can be unused, for example, in an embodiment with an FPGA with 84 cores, 80 virtual complex correlators can be employed. A person of ordinary skill in the art can further appreciate that digital signal processing cores can be referred to as digital signal processing core resources, DSP cores, or DSP core resources.

Figure 9:
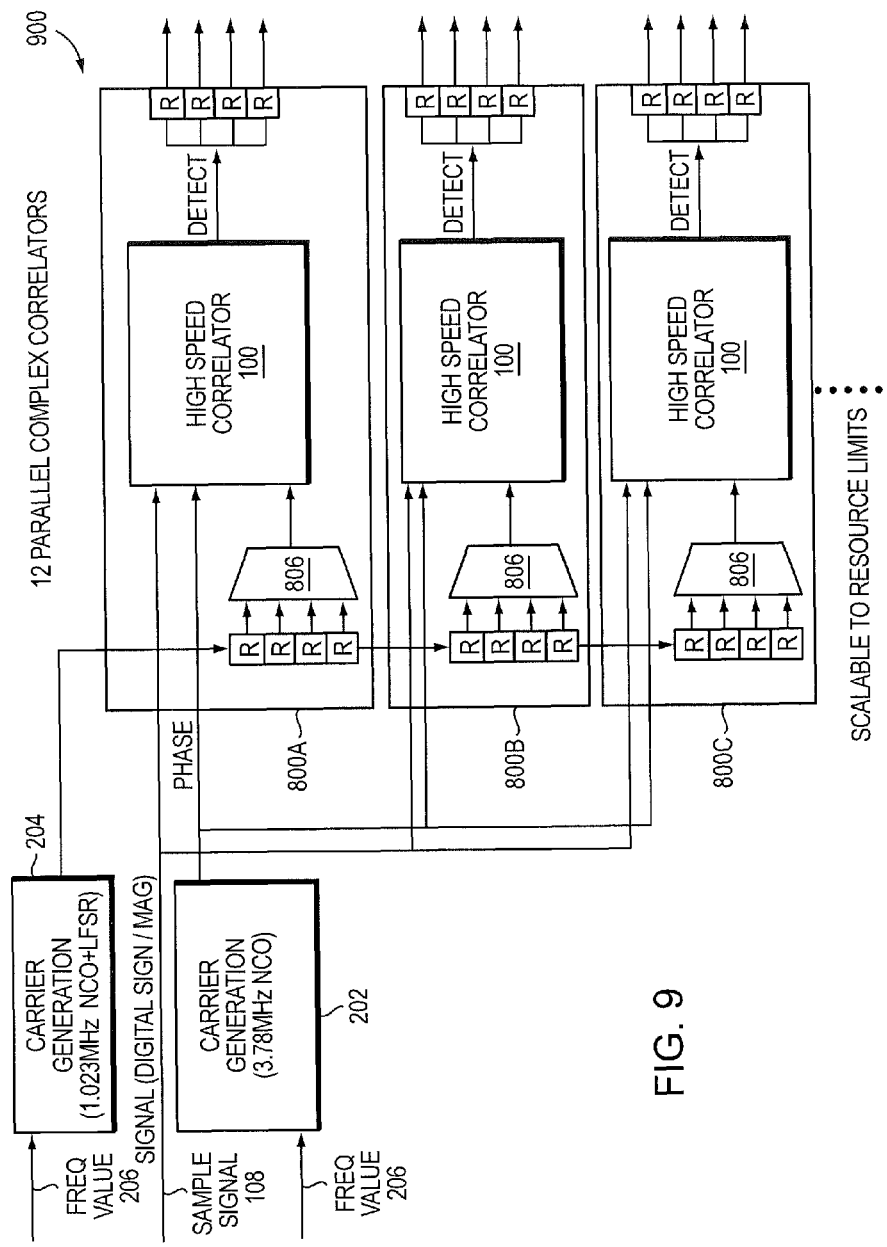
FIG. 9 is a block diagram illustrating a set of parallel complex correlators of the present invention.

FIG. 9 is a block diagram illustrating a set of parallel complex correlators 900. The set of parallel complex correlators 900 includes a plurality of virtual complex correlators 800A-C, each virtual complex correlator 800 as described above in FIG. 8. A person of ordinary skill of the art can recognize that any number of virtual complex correlators 800A-C can be used greater or less than the three displayed in FIG. 9. In this embodiment, the set of parallel complex correlators can scan for up to 12 estimate signals in the sample signal 108 at one time.

In addition, since the code signal estimates represent the same code sequence at different time offsets, multiple code generator blocks can be collapsed into a single code generator with a time delayed output. A shift register, as represented by the cascaded register (R), blocks in FIG. 9 can collapse multiple blocks into the single code generator. The shift register advances at twice the chipping rate for the GPS signal, and thus results in estimate signals that are each delayed by one half of a chip from the previous signal.

For example, a first 'R' block of a first virtual complex correlator 800A represents the code sequence delayed by 0.5 chips. A second 'R' block represents the code sequence delayed by 1.0 chips, a third 'R' block represents the code sequence delayed by 1.5 chips, and a fourth 'R' block represents the code sequence delayed by 2.0 chips. The second virtual complex correlator 800B uses its first 'R' block to start with 2.5 chips of delay and so forth down the chain for as many blocks as desired.

In one embodiment, the parallel complex correlators 900 operate at 2× the chipping rate, but the design itself is such that other offsets can be equally used based on the rate the code is shifted down the shift register.

Figure 10:
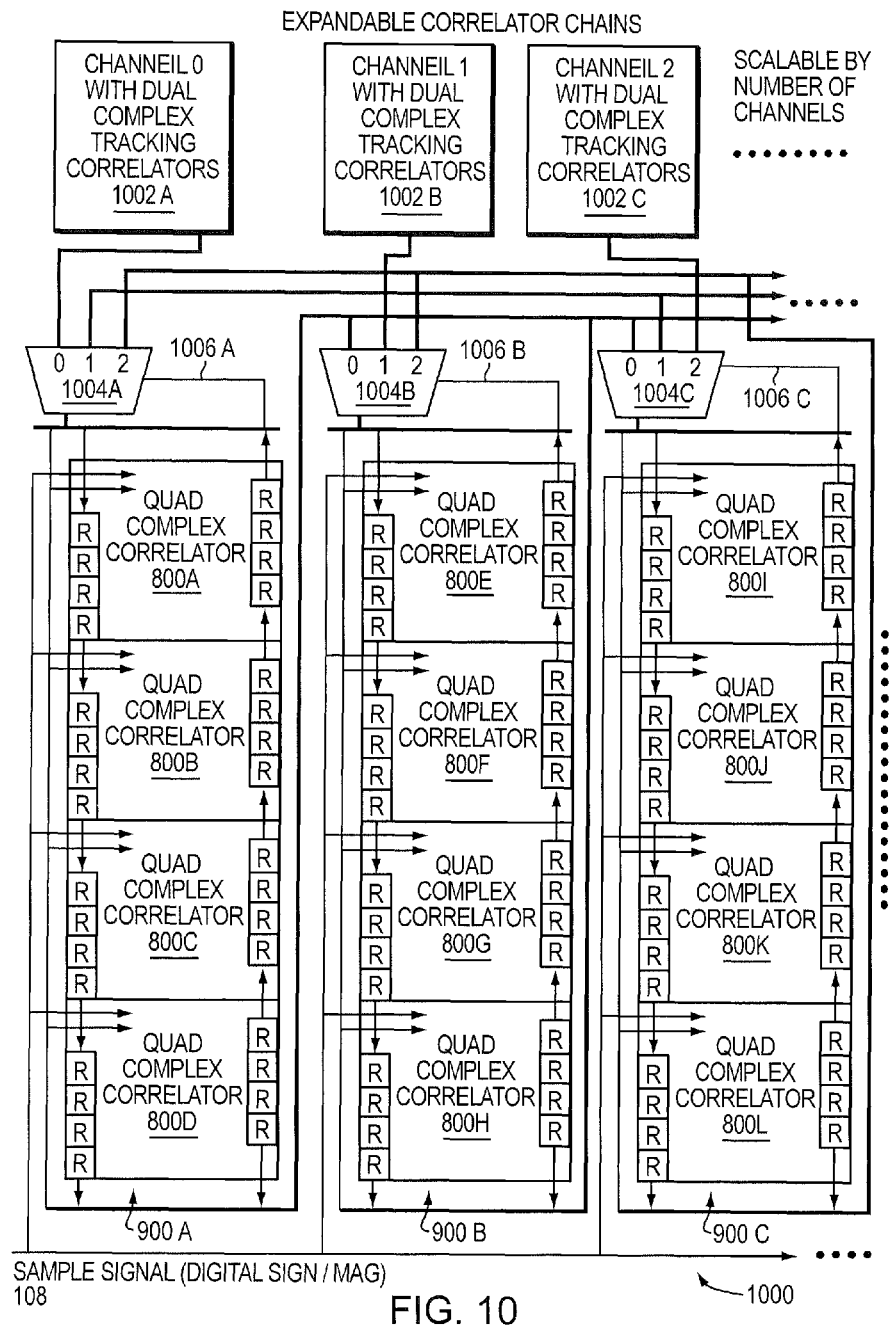
FIG. 10 is a block diagram illustrating an expandable correlator chain of the present invention.

FIG. 10 is a block diagram illustrating an expandable correlator chain 1000. The expandable correlator chain 1000 includes a plurality of sets of parallel complex correlators 900A-C, each parallel complex correlator 900 as described above in FIG. 9. Each set of parallel complex correlators 900A-C includes a plurality of virtual complex correlators 800 (described previously). The expandable correlator chain 1000 also includes a plurality of estimated signal channels 1002A-C, a plurality of expandable correlator multiplexers 1004A-C, and a plurality of expandable correlator multiplexer selection signals 1006A-C. A person of ordinary skill in the art can recognize that the plurality of estimated signal channels 1002, plurality of expandable correlator multiplexers 1004 and plurality of expandable correlator multiplexer selection signals 1006 can be expanded to any number operating or running in parallel. When one of the set of parallel complex correlators 900A-C detects the signal from its corresponding estimated signal channel 1002A-C, it activates its corresponding expandable correlator multiplexer selection signal 1006A-C. Activating the expandable correlator multiplexer selection signal sets the corresponding expandable correlator multiplexer 1004A-C to route a signal from a different channel to its corresponding set of parallel complex correlators 900A-C. In this manner, no set of parallel complex correlators 900A-C is unused or idle and all of the sets of parallel complex correlators 900A-C are actively searching for other sample signals.

The expandable correlator chain 1000 further advances the described shift register embodiment by shifting the detection result to another shift chain to link individual chains together to form even longer search chains.

As channels enter the tracking phase, their search correlators can be assigned to other channels that are still in the search phase. This causes a substantial increase in the search speed of the assigned channel as its search resources are doubled, tripled, etc.

While this invention has been particularly shown and described with references to example embodiments thereof, it will be understood by those skilled in the art that various changes in form and details may be made therein without departing from the scope of the invention encompassed by the appended claims.

What is claimed is:

1. A correlator of a global positioning system receiver in a global positioning system that receives a sample satellite signal comprising:
    a signal comparator configured to receive the sample satellite signal, a first normalized estimate signal, and a second normalized estimate signal, the signal comparator generating a first accumulated output and a second accumulated output, the first accumulated output representing the integration of a correlation of the sample satellite signal and the first normalized estimate signal, and the second accumulated output representing the integration of a correlation of the sample satellite signal and the second normalized estimate signal; and
    a threshold comparator configured to receive from the signal comparator the first accumulated output and the second accumulated output, the threshold comparator (a) using a multiplier, on a first clock cycle, calculating a first magnitude value based on the square of the first accumulated output and on a second clock cycle, calculating a second magnitude value based on the square of the second accumulated output and (b) comparing the first and second magnitude values with a threshold value, wherein if the sum of the first and second magnitude values is greater than the threshold value, then the threshold comparator determines that a successful signal detection was made and allows continued tracking of an estimate signal as the sample satellite signal;

wherein the estimate signal is derived from the first and second normalized estimate signal.

2. A correlator as claimed in claim 1 wherein the signal comparator includes:
   a demodulator configured to demodulate the sample satellite signal to form a first normalized signal and a second normalized signal,
   a mixer configured to intersect the first normalized signal with the first normalized estimate signal to form a first resultant signal and to intersect the second normalized signal with the second normalized estimate signal to form a second resultant signal, and
   an accumulator coupled to receive over an accumulation time period the first resultant signal and the second resultant signal, the accumulator integrating the first resultant signal to form the first accumulated output and the second resultant signal to form the second accumulated output over the accumulation time period, the first and second accumulated outputs indicating the correlation of the sample satellite signal with an estimate signal over the accumulation time period; and
   wherein if the sum of the first and second magnitude values is greater than the threshold value, then the threshold comparator allows continued tracking of the estimate signal as the sample satellite signal.

3. The correlator of claim 1 wherein the multiplier is built within a field-programmable gate array (FPGA) using dedicated digital signal processor (DSP) resources and thus not built from discrete logic gates inside the FPGA.

4. The correlator of claim 1 wherein the threshold comparator includes:
   a multiplexer,
   a first register,
   a second register, and
   a subtractor,
   wherein the multiplexer is coupled with a threshold value and the output of the second register as inputs,
   the threshold comparator stores the first magnitude value in the first register, and
   the subtractor subtracts the output of the first register with the threshold value of the multiplexer and stores a temporary result in the second register;
   wherein the threshold comparator further stores the second magnitude value in the first register, the subtractor further subtracts the output of the first register with the temporary result of the second register selected by the multiplexer and stores the result in the second register, the result in the second register being the sum of the first and second magnitude values.

5. The correlator of claim 2, wherein:
   the mixer intersects the first normalized signal with a plurality of first normalized estimate signals to form a plurality of first resultant signals and intersects a second normalized signal with a plurality of second normalized estimate signals to form a plurality of second resultant signals;
   the accumulator is coupled to receive the plurality of first resultant signals and the plurality of second resultant signals, the accumulator integrating each of the first resultant signals to form a plurality of first accumulated outputs and integrating the plurality of second resultant signals to form a plurality of second accumulated outputs over the accumulation time period, each of the first and second accumulated outputs indicating the correlation of the sample satellite signal with one of a plurality of estimate signals over the accumulation time period;
   the threshold comparator receives the plurality of first accumulated outputs and the plurality of second accumulated outputs, each of the plurality of first accumulated outputs corresponding with a different one of the plurality of second accumulated outputs, the threshold comparator (a) for each of the first accumulated outputs, calculating a first magnitude value based on the square of the first accumulated output and calculating a second magnitude value based on the square of the second accumulated output corresponding to the first accumulated output, and (b) comparing first and second magnitude values with the threshold value, wherein if a given sum of the first and second magnitude values is greater than the threshold value, the threshold comparator allows tracking of the estimate signal corresponding to the first and second accumulated outputs of the given sum to continue; and
   the plurality of estimate signals are derived from the plurality of first normalized estimate signals and plurality of second normalized estimate signals.

6. The correlator of claim 5, further comprising a time-division multiplexer configured to receive a multiplexing signal, the plurality of first normalized estimate signals and the plurality of second normalized estimate signals, wherein the time-division multiplexer selects, based on the multiplexing signal, among the plurality of first normalized estimate signals and the plurality of second normalized estimate signals from the time-division multiplexer.

7. The correlator of claim 2, further comprising a field-programmable gate array (FPGA) configured to implement at least one of the signal comparator and the threshold comparator.

8. The correlator of claim 2, further comprising a field-programmable gate array (FPGA) with dedicated digital signal processing resources configured to implement the threshold comparator.

9. The correlator of claim 2, further comprising a plurality of signal comparators and a plurality of threshold comparators, wherein the correlator is configured to reroute a set of signal comparators and a set of threshold comparators to detect a plurality of estimate signals, such that if a given pair formed of one signal comparator and one threshold comparator detects one estimate signal in the plurality of estimate signals, the given pair searches for a successive estimate signal in the plurality of estimate signals.

10. A Global Positioning System (GPS) receiver system that receives a sample satellite signal comprising:
   a multiplexer; and
   a plurality of correlators configured to receive (i) a plurality of estimate signals from the multiplexer and (ii) the sample satellite signal;
   wherein the multiplexer selects each estimate signal of the plurality by time-division multiplexing, and each correlator is configured to issue a detect signal when the received estimate signal matches the sample satellite signal; and
   wherein for a given correlator of the plurality, the given correlator further comprising one or more signal comparators and one or more threshold comparators, wherein the given correlator is configured to reroute the one or more signal comparators and the one or more threshold comparators to detect the plurality of estimate signals, such that if a given pair formed of one signal comparator and one threshold comparator detects one estimate signal in the plurality of estimate signals, the given pair searches for a successive estimate signal in the plurality of estimate signals, the one threshold comparator including a multiplier configured to calculate a first magnitude value on a first clock cycle and calculate a second magnitude value on a second clock cycle, if the sum of the first and second magnitude values is greater than a threshold value, then the one threshold comparator allows continued tracking of the detected one estimate signal as the sample satellite signal.

11. The GPS signal system of claim 10 further comprising:
a plurality of select logic coupled to the plurality of correlators, the plurality of estimate signals, and the detect signal of each correlator, the select logic configured to route unmatched estimate signals to a correlator that has issued a detect signal such that the plurality of correlators are effectively engaged.

12. A method of correlating a received sample signal in a global positioning system comprising:
demodulating the sample signal to form a first normalized signal and a second normalized signal;
intersecting the first normalized signal with a first normalized estimate signal to form a first resultant signal;
intersecting the second normalized signal with a second normalized estimate signal to form a second resultant signal;
integrating the first resultant signal to form a first accumulated output over an accumulation time period, the first accumulated output indicating the correlation of the sample signal with an estimate signal over the accumulation time period;
integrating the second resultant signal to form a second accumulated output over the accumulation time period, the second accumulated output indicating the correlation of the sample signal with the estimate signal over the accumulation time period;
calculating a first magnitude value based on the square of the first accumulated output, where calculating the first magnitude value occurs on a first clock cycle;
calculating a second magnitude value based on the square of the second accumulated output, where calculating the second magnitude value occurs on a second clock cycle;
comparing the sum of the first and second magnitude values with a threshold value; and
alerting a Global Positioning System (GPS) receiver to continue tracking the estimated signal as the sample signal if the sum of the first and second magnitude values is greater than the threshold value;
wherein the estimate signal is derived from the first and second normalized estimate signal.

13. The method of claim 12 further comprising:
(a) storing the first accumulated output in a first register;
(b) subtracting the output of the first register with a threshold value selected by a multiplexer;
(c) storing the result of the adding in a second register, the result being the sum of the first and second magnitude values;
(d) storing the second accumulated output in the first register after (c);
(e) subtracting the output of the first register from the output of the second register selected by the multiplexer; and
(f) storing in the second register the result of subtraction.

14. The method of claim 12, further comprising:
intersecting the first normalized signal with a plurality of first normalized estimate signals to form a plurality of first resultant signals;
intersecting the second normalized signal with a plurality of second normalized estimate signals to form a plurality of second resultant signals.
integrating each of the first resultant signals individually to form a plurality of first accumulated outputs and intersects each of the second resultant signals individually to form a plurality of second accumulated outputs over the accumulation time period, each of the first and second accumulated outputs indicating the correlation of the sample signal with one of a plurality of estimate signals over the accumulation time period;
for each of the first accumulated outputs, calculating a first magnitude value based on the square of the first accumulated output and calculating a second magnitude value based on the square of the corresponding second accumulated output, each of the plurality of first accumulated outputs corresponding with a different one of the plurality of second accumulated outputs; and
comparing the first and second magnitude values with the threshold value, wherein if a subject sum of the first and second magnitude values is greater than the threshold value then alerting the GPS receiver to continue tracking the estimated signal as the sample signal;
wherein the plurality of estimate signals are derived from the plurality of first normalized estimate signals and plurality of second normalized estimate signals.

15. The method of claim 14, further comprising selecting, over time, among the plurality of first normalized estimate signals coupled with a time-division multiplexer and the plurality of second normalized estimate signals coupled with the time-division multiplexer.

16. The method of claim 12, wherein the steps of integrating and summing are performed on a field-programmable gate array (FPGA) with one or more dedicated digital signal processing core resources.

17. The method of claim 12, further comprising rerouting a set of estimate signals of a plurality of sample signals, such that if a given sample signal is detected, a successive estimate signal is searched for.

18. A receiver method in a global positioning system that receives a sample signal comprising:
receiving the sample signal and a plurality of estimate signals from a multiplexer;
selecting, at the multiplexer, each of the plurality of estimate signals by time-division multiplexing to send to one of a plurality of correlators, wherein the one correlator further comprising one or more signal comparators and one or more threshold comparators, wherein the one correlator is configured to reroute the one or more signal comparators and the one or more threshold comparators to detect the plurality of estimate signals, such that if a given pair formed of one signal comparator and one threshold comparator detects one estimate signal in the plurality of estimate signals, the given pair searches for a successive estimate signal in the plurality of estimate signals, the one threshold comparator including a multiplier configured to calculate a first magnitude value on a first clock cycle and to calculate a second magnitude value on a second clock cycle, if the sum of the first and second magnitude values is greater than a threshold value, then the one threshold comparator allows continued tracking of the detected one estimate signal as the sample satellite signal; and
issuing, from one of the plurality of correlators, a detect signal when one of the plurality of estimate signals matches the sample signal.

19. The method of claim 18 further comprising routing unmatched estimate signals to each correlator that has issued a detect signal.

* * * * *